United States Patent [19]
Frenkel

[11] 3,922,678
[45] Nov. 25, 1975

[54] POLICE ALARM SYSTEM

[76] Inventor: Marvin A. Frenkel, 901 W. Lafayette Blvd., Detroit, Mich. 48226

[22] Filed: Mar. 25, 1974

[21] Appl. No.: 454,570

[52] U.S. Cl.............. 343/112 R; 325/29; 325/54; 340/24; 343/112 PT; 343/112 TC
[51] Int. Cl.².................. G01S 11/00; G08G 1/00
[58] Field of Search.... 343/112 PT, 112 D, 112 TC, 343/100 CS, 112 R; 340/24; 325/29, 54

[56] References Cited
UNITED STATES PATENTS

| | | | |
|---|---|---|---|
| 1,885,023 | 10/1932 | Dieckmann | 343/112 PT X |
| 2,904,674 | 9/1959 | Crawford | 343/100 CS |
| 3,568,161 | 3/1971 | Knickel | 340/24 X |
| 3,747,104 | 7/1973 | Pansini | 343/112 R |

Primary Examiner—Maynard R. Wilbur
Assistant Examiner—Richard E. Berger
Attorney, Agent, or Firm—Philip Sands, Esq.

[57] ABSTRACT

A method and apparatus for selectively determining the location at which an emergency alarm signal is generated, the method comprising the steps of arranging a plurality of wireless signal detectors in a pattern wherein they are spaced such that their respective circular regions of signal detection overlap one another, and detecting a transmitted wireless signal in a zone corresponding to any one of the overlapping regions by at least two detectors whose overlapping regions define the zone in which the signal is transmitted.

13 Claims, 4 Drawing Figures

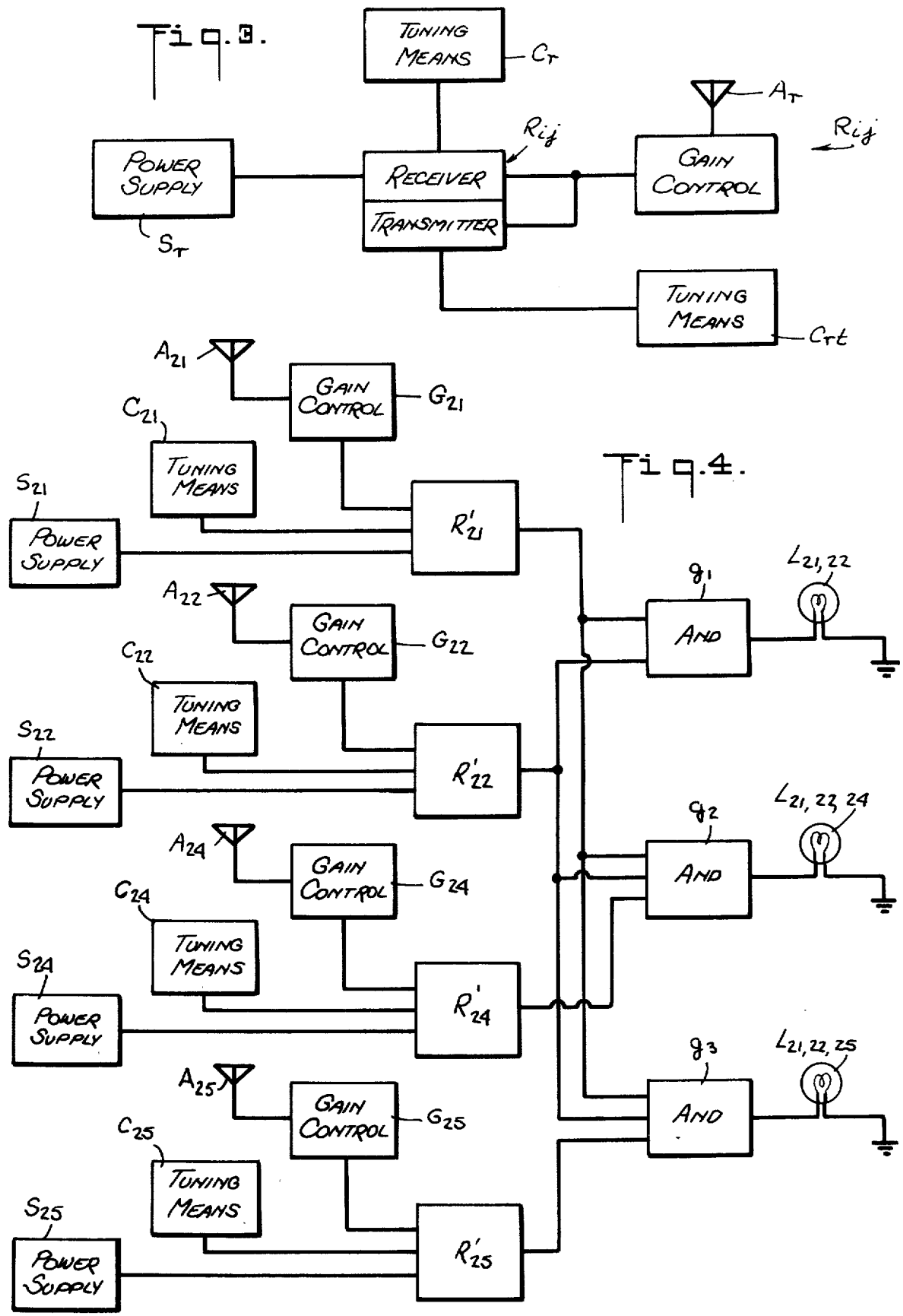

POLICE ALARM SYSTEM

BACKGROUND OF THE INVENTION

The present invention relates generally to means for detecting and tracking a mobile source, and more particularly to a method and apparatus for selectively determining the location at which an emergency alarm signal is generated.

In the battle against crime, police patrol cars are often in rapid pursuit of suspects seeking to escape from the scene of a wrongdoing. The police authorities in the pursuing vehicle generally radio headquarters for assistance from fellow officers in nearby patrol cars. The assistance requested necessarily involves continuing instructions as to the continually changing locations that the pursuing patrol car effects as it follows the suspects. This is especially dangerous when only one officer is in the pursuing patrol car since it requires the "solo" officer to alter his attention from driving and periodically manipulate a radio transmitter while driving often at dangerously high speeds. Not only is the welfare of the pursuing officer thereby seriously jeopardized, but so is that of the public-at-large. Clearly the pursuing officer should preferably be entirely free to manipulate his vehicle unencumbered from the distraction of radioing headquarters of his everchanging positions.

Another situation which often develops, in the battle against crime, is the need for detecting and tracking the location of a stolen package, for example, a package of money paid as ransom for a person or thing kidnapped or stolen. It is very difficult to secretly track kidnappers or thieves after they have taken possession of the ranson package without the kidnappers or thieves becoming aware that they are being tracked. Therefore, police patrol cars, whether marked or unmarked, cannot effectively and reliably track kidnappers or thieves without losing the position of the suspects and without giving away their own.

SUMMARY OF THE INVENTION

Accordingly, it is an object of the present invention to provide a method and apparatus for selectively determining a location at which a wireless alarm signal is generated in a manner requiring no manipulaion of the alarm transmitting source, and in a manner which is undetectable by fleeing criminal suspects.

It is another object of the present invention to provide a police alarm system which is safe, reliable and easily arranged.

The above and other objects, as will become clear, are achieved under "ideal" conditions of little or no wireless signal interference by providing apparatus which comprises a fixed array of detectors having, preferably, a common sensitivity for receiving a generated wireless alarm signal. The detectors are, preferably, equidistantly spaced from one another in substantially rows and columns along a selected topography (city streets and the like). At least one transmitter is provided anywhere on the selected topography for transmitting an alarm signal of sufficient intensity to activate at least two adjacent ones of the detectors. Each transmitter has a distance-of-transmission capacity at the aforementioned intensity which substantially corresponds to the distance at which the detectors are equidistantly spaced from one another.

A map corresponding to the selected topography is marked firstly with the locations at which the detectors are positioned, and secondly with imaginary circles having respective centers corresponding to the locations of the detectors. The circles each correspond in radial size to the distance at which the detectors are equidistantly spaced from one another. The circles thereby have mutually overlapping sectors which define respective zones in which a transmitted wireless signal is detectable by at least two of the detectors which correspond to the overlapping sectors defining the zone in which the signal is transmitted.

The present invention also contemplates a method of developing a wireless signal detection pattern under other than "ideal" conditions wherein there is substantial interference with a transmitted wireless signal, the method comprising the steps of arranging wireless signal detectors on a selected topography such that their regions of signal detection overlap one another. The locations need not necessarily be in rows and columns, but merely need be successively chosen so that their actually determined regions of detection are defined by imaginary closed signal loops (not necessarily circular) of identical minimum intensity which on a map of the topography overlap one another. The overlapping loop portions define respective zones in which a wireless alarm signal may be detected by a combination of detectors whose overlapping loop portions define the zone in which the signal is transmitted.

BRIEF DESCRIPTION OF THE DRAWINGS

The above and additional object and advantages of this invention will be more clearly understood from the following detailed description thereof when read in conjunction with the accompanying drawings, in which:

FIG. 3 shows diagrammatically a typical signal detection and relay means according to the present invention; and FIG. 4 illustrates a logic circuitry of receivers and appurtenant devices at a control station which are responsive to respective relay means, such as the typical signal relay means illustrated in FIG. 3.

DETAILED DESCRIPTION OF THE INVENTION

Figure 1:
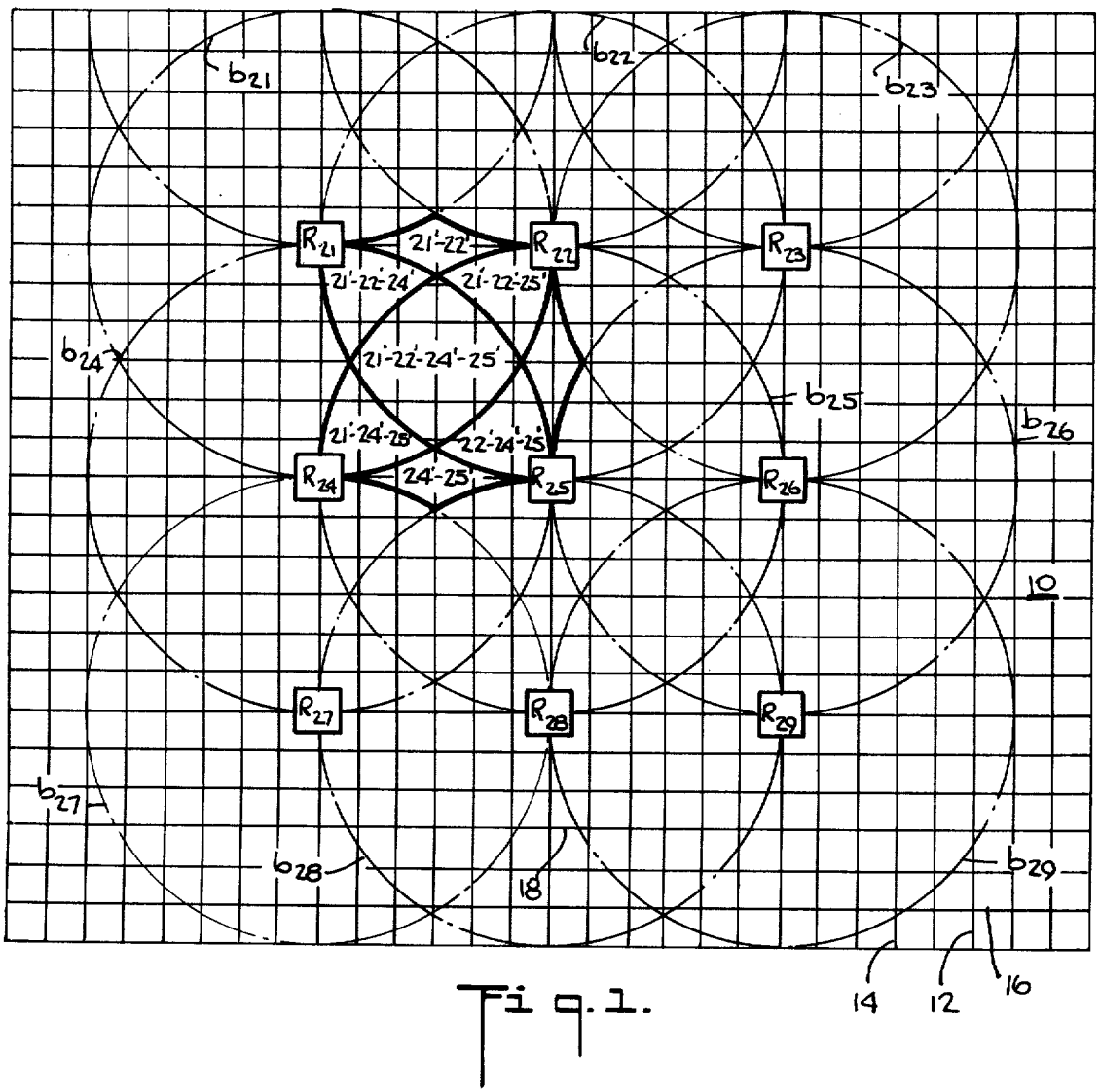
FIG. 1 is a schematic plan view of a map or, alternatively, a mapped topograpy indicating the spacing and locations of signal detection and relay means strategically located in a field.

Referring now to the drawings, and more particularly to FIG. 1, there is illustrated a map 10 of a selected field or topography (a city or the like) upon which are denoted various streets 12, 14, 16 and 18 in a grid-like matrix. Marked on the map 10 are a plurality of wireless signal detecting and relaying positions which are denoted by the reference character R and a respective numerical $ij$ subscript. These positions are equidistantly spaced from one another in rows and columns and correspond to strategically located wireless signal detecting and relay means positioned and hidden preferably, but not necessarily, at a substantially common elevation in the field of topography represented by the map 10.

Also marked upon the map 10 are a plurality of circles having respective centers which correspond to the detecting positions. The circles are each denoted by the reference character $b$ and a respective numerical $ij$ subscript which corresponds to the detecting and relaying position $R_{ij}$ at the respective center thereof. The circles $b_{ij}$ are imaginary, are illustrated in phantom and correspond in radial size to the distance at which the relay means in the field are commonly spaced from one another.

The circles $b_{ij}$ have mutually overlapping sectors which define respective zones on the map 10 in which a transmitted wireless signal is detectable by at least two adjacent ones of detecting and relaying means $R_{ij}$ which correspond to the overlapping sectors defining the zone in which the signal is transmitted. The activated relay means and corresponding overlapping circle sectors, thus, will in combination indicate the location of a mobile transmitter. Typical zones defined by the overlapping circle sectors are those zones, for example, 21'–22', 21'–22'–24', 21'–22'–25', 21'–22'–24'–25', 22'–24'–25'–, and 24'–25'. The above zones are defined by portions of the overlapping circle sectors of the detecting positons at $R_{21}$, $R_{22}$, $R_{24}$ and $R_{25}$. These zones are shown in solid line for illustrative purposes only.

Figure 2:
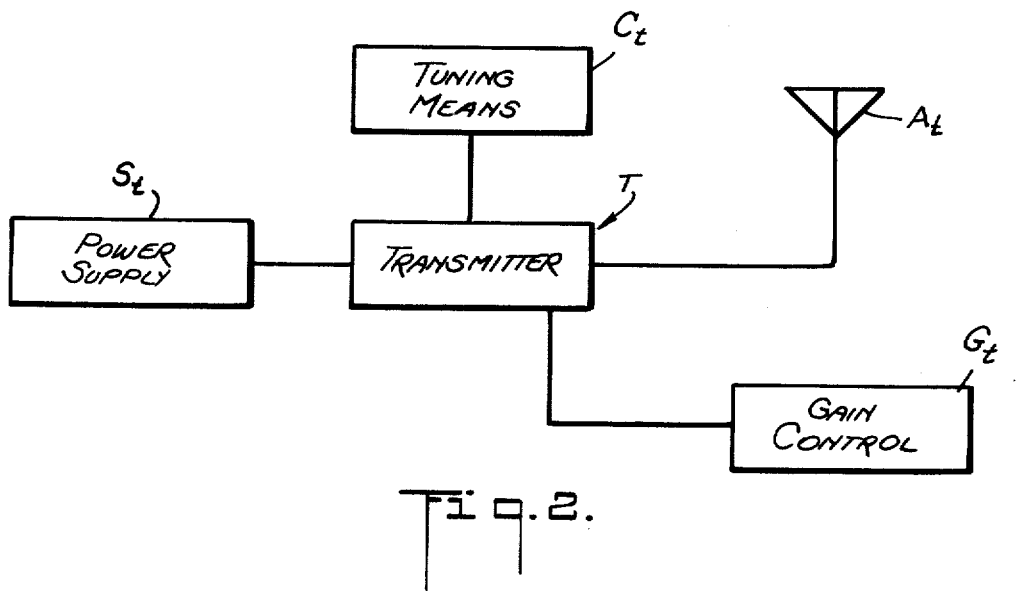
FIG. 2 shows diagrammatically a signal generating means according to the present invention.

FIG. 2 shows, in diagrammatic form, a wireless signal generating and transmitting means according to the present invention. It will be understood that other types of transmitters may be used equally well. Pursuant to one embodiment of the transmitting means of the present invention, a power supply $S_t$ supplies power at a given voltage level to a conventional transmitter T, for transmitting an amplitude modulated radio frequency signal. A conventional tuning means $C_t$ in the form, for example, of a variable tuning condenser may be connected in a manner well known to those skilled in the art to the transmitter T so that the latter will generate a predetermined signal, for example, a signal of predetermined frequency, to be radiated by the antenna $A_t$. For adjustment of the intensity of the signal transmitted, there may be provided a gain control $G_t$ in the form, for example, of a variable potentiometer connected to an amplifier stage of the transmitter T in a manner well known to those skilled in the art.

FIG. 3, likewise in diagrammatic form, shows a typical wireless signal detecting and relay means $R_{ij}$ which corresponds in field location to one of the positions $R_{21}$ through $R_{29}$ denoted on the map 10 in FIG. 1. Each detecting and relay means $R_{ij}$ may, for example, be a beacon, a transceiver, or a transponder and the like and functions to both receive and transmit a wireless signal. It will be understood that the nature of each relay means $R_{ij}$ is entirely conventional and, thus, its details of construction and operation are omitted herefrom.

Each relay means $R_{ij}$ may, for example, be provided with appurtenant devices such as those appurtenances of the transmitter T illustrated in FIG. 2. In this respect, the receiver portion of each relay means $R_{ij}$ may be controlled by tuning means $C_r$ in the form of, for example, a variable tuning condenser. A gain control $G_r$ in the form, for example, of a variable potentiometer connected to amplifier stages of both the receiver and transmitter portions of each relay unit $R_{ij}$ and having connected thereto an antenna $A_r$, may be provided for adjustment of the intensity of the signal received from the transmitter T in FIG. 2. A power supply $S_r$ is provided for supplying each relay unit $R_{ij}$ with voltage at a predetermined level. The transmitter portion of each relay $R_{ij}$ is also provided with a tuning means $C_{rt}$ in the form, for example, of a variable tuning condenser to permit controlling of the frequency of an output signal by the transmitter portion.

FIG 4 shows, diagrammatically, logic circuitry for signalling the presence or absence of a transmitted signal in a particular zone defined by the overlapping circle sectors on the map 10. The logic circuitry illustrates an arrangement of only four receivers $R'_{21}$, $R'_{22}$, $R'_{24}$ and $R'_{25}$ corresponding to the detecting and relaying means $R_{21}$, $R_{22}$, $R_{24}$ and $R_{25}$, although it will be understood that other receivers corresponding to others of the detecting and relaying means of FIG. 1 will be similarly arranged. These receivers are preferably all located at a control station, such as police headquarters or other central means, and are adapted to receive a wireless signal from a corresponding one of the relay units $R_{21}$, $R_{22}$, $R_{24}$ and $R_{25}$ positioned as aforementioned in the field of selected topography.

Each receiver $R'_{ij}$ is provided with appurtenances similar to the appurtenances provided for the relay unit $R_{ij}$ in FIG. 3 and for the transmitter in FIG. 2. In this respect, the receiver $R'_{21}$ is provided with a gain control $G_{21}$ in the form, for example, of a variable potentiometer connected to an amplifier stage of the receiver $R'_{21}$, an antenna $A_{21}$ connected to the gain control $G_{21}$, a conventional tuning means $C_{21}$ in the form, for example, of a variable tuning condenser, and a power supply $S_{21}$. Similarly, the receiver $R'_{22}$ is provided with a gain control $G_{22}$, an antenna $A_{22}$ connected to the gain control $G_{22}$, a conventional tuning means $C_{22}$, and a power supply $S_{22}$. The receiver $R'_{24}$ is provided with a gain control $G_{24}$, an antenna $A_{24}$ connected to the gain control $G_{24}$, a conventional tuning means $C_{24}$, and a power supply $S_{24}$. The receiver $R'_{25}$ is provided with a gain control $G_{25}$, a conventional tuning means $C_{25}$, and a power supply $S_{25}$.

It will be understood that each and every one of the receivers $R'_{ij}$ at police headquarters other than those aforementioned, but which correspond to others of the relay unit locations on the map 10, are provided with similar appurtenances for permitting control thereover. It will also be understood that each of the receivers $R'_{ij}$ illustrated in FIG. 4, and similarly other receivers disposed at police headquarters (not shown), may be of the type comprising a radio frequency amplifier, a detector for developing an audio frequency signal, an amplifier stage, and a detector for developing a DC signal representing the amplitude of the output audio frequency signal used for energizing various switching means and other equipment connected thereto.

The receivers $R'_{ij}$ illustrated in FIG. 4, and the transmitter T illustrated in FIG. 2, may, for example, be similar to those described and illustrated in U.S. Pat. No. 2,788,521. The relay unit $R_{ij}$ illustrated in FIG. 3, which is provided with a receiver portion and a transmitter portion may, for example, be a transponder or the like discussed in U.S. Pat. No. 3,646,580. The subject matter of the aforementioned patents is incorporated herein by reference.

The output sections of selected combinations of the receivers $R'_{ij}$ are operatively associated with respective switching means and visual indicators (lamps). Moreover, each of aforementioned zones defined by the overlapping circle sectors on the map 10 is associated with a respective one of the visual indicators which will light when selected ones of the relay units $R_{ij}$ transmit a wireless signal from the transmitter T to corresponding ones of the receivers $R'_{ij}$ at police headquarters.

For example, if the transmitter T transmits a signal in the zone 21'-22', the light $L_{21,22}$ in that zone will light to signal the presence of the transmitter T therein. This is effected through the intermediary of a switching means in the form of, for example, an AND gate $g_1$ which is selectively coupled with the receivers $R'_{21}$ and $R'_{22}$, as illustrated in FIG. 4. Similarly, if the transmitter T transmits a signal in the zone 21'-22'-24', the light $L_{21,22,24}$ will signal the presence of the transmitter T therein. This is effected through the intermediary of the AND gate $g_2$ which is selectively coupled to the receivers $R'_{21}$, $R'_{22}$ and $R'_{24}$. If the transmitter T, for example, transmits a signal in the zone 21'-22'-25', the light $L_{21,22,25}$ will signal same. This is effected through the intermediary of the AND gate $g_3$ which is electrically coupled selectively to the receivers $R'_{21}$, $R'_{22}$ and $R'_{25}$. Similar lights, AND gates and wiring combinations are provided for the others of the receivers, and are coupled to one another in combination in a manner similar to that described for the receivers illustrated in FIG. 4. The nature of the coupling is well understood by those skilled in the art and, therefore, the description of same is omitted herefrom.

It should be understood that although the receivers illustrated in FIG. 4 have been described as having logic circuitry which includes the respective AND gates, the use of these AND gates is merely a preferred embodiment or mode of effecting the operation of the present invention. Clearly other mechanical and electromechanical devices, such as mechanical relays and the like, may be substituted for the AND gates and may be coupled to the receivers in a manner well known to those skilled in the art. It is contemplated, therefore, that the present invention encompass same.

The present invention is practiced as follows:

The detecting and relaying units $R_{ij}$, all having a common sensitivity, are strategically positioned and hidden equidistantly from one another in rows and columns at a substantially common elevation in the field of selected topography, for example, along city streets and the like. The positions of the relay units $R_{ij}$ are then marked upon a map 10 of the selected topography and circles having respective centers corresponding to the locations of the relay units $R_{ij}$ are drawn upon the map 10. Each of the circles has the same radial dimension as that of the others, the radial dimension corresponding to the spacing or distance that the relay units $R_{ij}$ are separated from one another. Respective light sources or other means of visual indication are then disposed within the zones defined by the overlapping circle sectors on the map 10, and are electrically coupled to respective combinations of the receivers $R'_{ij}$, through the intermediary of AND gate circuitry, or other similar functional means, in a manner illustrated generally in FIG. 4.

Then, at least one transmitter, such as the transmitter T illustrated in FIG. 2, having an intensity sufficient to activate at least two adjacent ones of the commonly sensitive relay units $R_{ij}$, is positioned in the field of selected topography. The transmitter T is then adjusted by means of an associated gain control $G_t$ or the like such that its distance-of-transmission capacity substantially corresponds to the distance at which the relay units $R_{ij}$ are spaced from one another. The frequency of the output signal of the transmitter T is controlled such as by means of the tuning means $C_t$. Likewise, the tuning means $C_r$ associated with the receiver portion of each relay unit $R_{ij}$ is adjusted so that all of the relay units $R_{ij}$ will commonly respond to an identical frequency. However, each tuning means $C_{rt}$ associated with the transmitter portion of each relay units $R_{ij}$ is adjusted such that each and every one of the relay units $R_{ij}$ transmits an outgoing wireless signal at a frequency differing from each and every one of the others. Thereafter, the respective tuning means of each of the receivers $R'_{ij}$ (FIG. 4) is adjusted so that each of the receivers $R'_{ij}$ at police headquarters responds to only one frequency corresponding to the frequency of the signal transmitted by a relay unit $R_{ij}$ associated therewith.

Then, if the transmitter T is in a condition of transmitting a wireless signal, anywhere along the field of the aforementioned selected topography, the location at which the transmitter T is in a condition of signalling will be first detected by a selected combination of relay units $R_{ij}$. The latter combination will then transmit signals to their corresponding receivers $R'_{ij}$ at police headquarters. For example, if the transmitter T is signalling in the zone 21'-22', the relay units $R_{21}$ and $R_{22}$ which correspond to the receivers $R'_{21}$ and $R'_{22}$ will be commonly activiated and will in combination activate the latter receivers. The latter receivers will then, in combination, activate the AND gate $g_1$ which will in turn activate the lamp $L_{21,22}$.

If the transmitter T is in a police patrol car and is pursuing criminal suspects in a fleeing vehicle, all the police officer need do is to immediately activate the transmitter T in the patrol car and simply and safely pursue the suspects. The transmitter T will continually signal respective combinations of relay units $R_{ij}$ which will in turn continually signal their associated receivers $R'_{ij}$ the location at which the transmitter T is signalling an alarm. As the patrol car moves from one zone to the next, different combinations of relay units $R_{ij}$ and receivers $R'_{ij}$ will be activated to effect the lighting of corresponding ones of the lamps in the zones defined on the map 10. Police headquarters can thereby maintain constant contact with the pursuing patrol vehicle, and can immediately notify a nearby patrol car of the need for assistance by the pursuing patrol car.

Similarly, the transmitter T may be concealed within the confines of a ransom package or the like. Thus, when kidnappers or thieves pick up the ransom package, the ransom package and the thieves alike can be reliably tracked anywhere along the field of the aforementioned selected topography without suspecting that they are being tracked. Clearly, the present invention for detecting and tracking positions of a mobile transmitter, or transmitters, may be put to many uses, although not discussed herein. All such uses are contemplated herein as being encompassed by the present invention.

The above system represents one which may be effective under "ideal" conditions, namely conditions under which interference with the transmitted wireless signal by its surrounding medium is practically non-existant. Since most wireless signals, whether they be of AM or FM derivation, are to some degree affected by the atmosphere and by both natural and man-made obstacles, the above ideal system may be modified pursuant to the present invention.

In this respect, the present invention contemplates an empirical method of developing a wireless signal detection pattern which comprises the steps of transmitting a wireless signal of fixed characteristics (frequency, intensity, etc.) omni-directionally at various selected locations along the selected topography, and detecting signals of identical minimum intensity along respective imaginary closed loops (not necessarily circular) which surround the selected locations. The closed loops and selected locations are then developed on a map of the topography, the locations each being chosen in succession so that the closed loops developed on the map, which correspond to those closed loops of identical minimum signal intensity on the topography, overlap one another by a desired extent which adequately isolates adjacent topographical zones of selected sizes.

Then detectors, receivers or relay units are positioned on the topography at the selected locations, respectively, each having a region of wireless signal detection corresponding to the closed loop surrounding it. Preferably, but not necessarily, the detectors all have a substantially identical sensitivity. However, when the detectors do have different sensitivities, the closed loops are determined with the specific detectors to be positioned on the topography.

When all of the detectors are positioned properly, a wireless alarm signal of the aforementioned fixed characteristics may be transmitted anywhere on the topography. This signal will then be detected by at least two of the detectors whose overlapping loop portions define the zone in which the signal is transmitted. Thus, a combination of detectors respond to the transmitted signal and act to define the location or zone of the transmitted signal. The detectors may be associated with corresponding receivers at police headquarters and visual indicators, such as lamps or the like, positioned in the zones denoted on the map of the topography.

In order to give the present invention a three-dimensional capacity, it is likewise contemplated that additional detectors or relay units be located equidistantly from one another in the field of selected topography in one or a plurality of vertical arrays above selected corresponding ones of those relay units in the first said arrangement. Naturally, appropriate receivers would be placed at police headquarters for this purpose likewise. Accordingly, the relay units may, for example, be installed at traffic signals, street signs, street lights, trees, buildings, etc. Thus, tracking may be effected vertically, for example, in various buildings such as skyscrapers and the like.

Numerous alterations of the structure herein disclosed will suggest themselves to those skilled in the art. However, it is to be understood that the present disclosure relates to preferred embodiments of the invention which are for purposes of illustration only and not to be construed as a limitation of the invention.

What is claimed is:

1. Apparatus for selectively determining a location at which an alarm signal is generated, comprising:
    a fixed array of wireless signal detecting means having a substantially identical sensitivity for receiving a generated alarm signal,
    said detecting means being equidistantly spaced from one another in substantially rows and columns along a selected topography; and
    at least one wireless signal generating means anywhere on said selected topography for transmitting an alarm signal of sufficient intensity to activate at least two adjacent ones of said detecting means simultaneously,
    said generating means generating a signal whose distance-of-transmission at said intensity substantially corresponds to the distance at which said detecting means are equidistantly spaced from one another.

2. Apparatus as claimed in claim 1, wherein said detecting means includes a plurality of receiver means tuned to respond to a signal of selected frequency, said generating means including at least one mobile transmitter tuned to generate a signal at said selected frequency.

3. Apparatus as claimed in claim 1, including a map of said selected topography, said map indicating thereon (a) the locations at which said detecting means are positioned, and (b) imaginary circles having respective centers corresponding to the locations of said detecting means, said circles corresponding in size to the distance at which said detecting means are equidistantly spaced from one another and having mutually overlapping sectors which define respective zones in any of which a transmitted wireless signal is detectable by at least two of said detecting means which correspond to the overlapping sectors defining the zone in which the signal is transmitted.

4. Apparatus as claimed in claim 3, including a control station at which said map is stored, and receiver means at said control station, said detecting means including relay means for transmitting signals to respective ones of said receiver means to indicate at said control station which of said detecting means are activated by said generating means, each said relay means and its corresponding receiver means being associated with one another by a common frequency differing from the common frequency of the others of the corresponding relay means and receiver means.

5. Apparatus as claimed in claim 4, wherein said receiver means includes a plurality of visual indicators which are positioned in said zones, respectively, and are responsive to said detecting means.

6. Apparatus as claimed in claim 1, including at least one further fixed array of detecting means situated in a substantially vertical plane above selected corresponding ones of said detecting means, said arrays of detecting means in combination constituting a three-dimensional signal locating system.

7. In a method of selectively determining a location at which an alarm signal is generated, comprising the steps of:
    arranging a plurality of wireless signal detectors having a substantially identical sensitivity for receiving a generated alarm signal in a fixed array of rows and columns along a selected topography such that said detectors are equidistantly spaced from one another;
    generating a wireless signal anywhere on said selected topography of sufficient intensity to activate at least two adjacent ones of said detectors simultaneously, and
    controlling the intensity of the generated wireless signal such that its distance-of-transmission substantially corresponds to the distance at which said detectors are equidistantly spaced from one another.

8. A method as claimed in claim 7, including tuning said detectors such that they respond to a wireless signal of selected frequency, and generating said wireless signal at said selected frequency by a transmitter movable along said selected topography.

9. A method as claimed in claim 7, including marking on a map of said selected topography (a) the locations at which said detectors are positioned, and (b) imaginary circles having respective centers corresponding to the locations of said receivers and respective radial dimensions corresponding in size to the distance at which said detectors are spaced from one another, said circles having mutually overlapping sectors which define respective zones in any of which a transmitted wireless signal is detectable by at least two of said detectors which correspond to the overlapping sectors defining the zone in which the signal is transmitted.

10. A method as claimed in claim 9, including storing said map at a control station, and positioning on said map in said zones visual indicators which are responsive to said detectors respectively, to define visually which of the latter are activated by the generated wireless signal.

11. In a method of selectively determining a location at which an alarm signal is generated, comprising the steps of:
  a. developing a wireless signal detecting pattern; and
  b. detecting a wireless alarm signal by said pattern, said step (a) comprising:
   transmitting a wireless signal omni-directionally at a plurality of spaced locations along a selected topography;
   detecting on said topography signals of identical minimum intensity along respective imaginary closed loops surrounding each of said spaced locations;
   developing on a map of said topography said spaced locations and the loci of said closed loops which surround said spaced locations, respectively;
   selecting said spaced locations such that selected portions of said closed loops overlap one another; and
   positioning on said topography at said spaced locations respective wireless signal detectors each having a region of detection corresponding to the closed loop surrounding it,
   the overlapping loop portions defining discrete zones in any of which a transmitted wireless signal is detectable simultaneously by at least two detectors corresponding to the overlapping loop portions which define the zone in which the wireless signal is transmitted, said step (b) comprising:
   transmitting a wireless alarm signal in any of said zones; and
   detecting said wireless alarm signal by at least two detectors simultaneously which correspond to the zone in which the alarm signal is transmitted.

12. A method as claimed in claim 11 wherein each of said detectors is a relay unit having a receiver portion and a transmitter portion, each of said receiver portions having a substantially identical sensitivity for receiving transmitted alarm signal; and including tuning each of said receiver portions to receive an identical frequency, tuning each of said transmitter portions to transmit respective wireless signals at frequencies differing from one another, positioning a plurality of receivers at a control station which correspond respectively to each of said detectors, and tuning each of said receivers to receive respective signals corresponding in frequency to the signal transmitted by the transmitter portion of the detector associated therewith.

13. A method as claimed in claim 12, including positioning in each of said zones on said map a respective visual indicator, and electrically coupling said indicators to respective combinations of said receivers which correspond to and define the zones in which the visual indicators are positioned.

* * * * *